(12) United States Patent
Birch

(10) Patent No.: US 12,317,779 B2
(45) Date of Patent: Jun. 3, 2025

(54) SWIVEL COUPLING DEVICE FOR RAKES AND OTHER YARD TOOLS

(71) Applicant: DREAM LEAVES INVESTMENTS, INC., Kissimmee, FL (US)

(72) Inventor: Clyde E. Birch, Kissimmee, FL (US)

(73) Assignee: DREAM LEAVES INVESTMENTS, INC., Kissimmee, FL (US)

( * ) Notice: Subject to any disclaimer, the term of this patent is extended or adjusted under 35 U.S.C. 154(b) by 720 days.

(21) Appl. No.: 17/695,052

(22) Filed: Mar. 15, 2022

(65) Prior Publication Data

US 2023/0138223 A1 May 4, 2023

Related U.S. Application Data

(60) Provisional application No. 63/274,602, filed on Nov. 2, 2021.

(51) Int. Cl.
*A01D 7/10* (2006.01)

(52) U.S. Cl.
CPC .................. *A01D 7/10* (2013.01)

(58) Field of Classification Search
CPC ............. A01D 7/00–7/10; A01B 1/00–1/246
See application file for complete search history.

(56) References Cited

U.S. PATENT DOCUMENTS

| | | | |
|---|---|---|---|
| 1,005,247 A | 10/1911 | Lovett | |
| 1,445,548 A * | 2/1923 | Owen | A01B 1/02 294/60 |
| 1,588,927 A | 6/1926 | Willis | |
| 2,497,192 A | 2/1950 | Thayer, Jr. | |
| 2,945,713 A | 7/1960 | Sears | |
| 3,350,866 A | 11/1967 | Spencer | |
| 3,643,410 A | 2/1972 | Menning | |
| 3,688,484 A | 9/1972 | Cox | |
| 3,776,092 A | 12/1973 | Seckerson | |
| 4,037,397 A | 7/1977 | Florentino | |
| 4,050,728 A | 9/1977 | Davidson | |
| 4,292,794 A | 10/1981 | Gascon | |
| 4,427,227 A * | 1/1984 | Haskell | B25B 7/00 294/51 |
| 4,514,970 A * | 5/1985 | Wilson | A01D 7/00 294/51 |
| 4,688,961 A | 8/1987 | Shioda et al. | |
| 4,991,386 A | 2/1991 | Dirksen | |
| 5,058,370 A | 10/1991 | Russell | |
| D336,731 S | 6/1993 | Nichols, Jr. | |
| 5,459,988 A | 10/1995 | Glaser | |

(Continued)

FOREIGN PATENT DOCUMENTS

| | | | | |
|---|---|---|---|---|
| AU | 2006100731 A4 | * | 9/2006 | |
| JP | 2014185503 A | * | 10/2014 | |
| WO | WO-9635322 A1 | * | 11/1996 | A01D 7/10 |

*Primary Examiner* — Christopher J Sebesta
*Assistant Examiner* — Madeline I Runco
(74) *Attorney, Agent, or Firm* — Hudak, Shunk & Farine Co., LPA

(57) ABSTRACT

A swivel coupling device for rakes or other yard tools having handles that allows two of the implements to be quickly and easily connected for use of the combination to scoop, rake or the like various materials, and disconnected just as easily thereafter. The device includes a pair of clamp assemblies including tubular sleeves rotatably connected by a swivelable knuckle or in other words a swivel joint.

20 Claims, 6 Drawing Sheets

(56) References Cited

U.S. PATENT DOCUMENTS

| | | | |
|---|---|---|---|
| 5,499,852 A * | 3/1996 | Seigendall | B25G 1/00 |
| | | | 294/58 |
| 5,564,266 A | 10/1996 | Laughlin | |
| 5,901,540 A | 5/1999 | Vella | |
| 6,120,073 A | 9/2000 | Jones | |
| 6,904,743 B2 | 6/2005 | Vodinh | |
| 7,131,255 B1 * | 11/2006 | Caneba | A01D 7/10 |
| | | | 56/400.12 |
| 7,168,230 B1 * | 1/2007 | Waddell | A01D 7/10 |
| | | | 294/50.6 |
| 7,661,258 B1 | 2/2010 | Petruzelli | |
| 8,641,111 B2 * | 2/2014 | Lee | A01G 20/43 |
| | | | 294/58 |
| 9,642,296 B1 * | 5/2017 | Long | A01G 20/40 |
| 9,924,630 B2 * | 3/2018 | Kairys | A01D 7/10 |
| 10,091,953 B1 * | 10/2018 | Stagner | A01G 20/43 |
| 11,236,478 B2 * | 2/2022 | Avila | B65D 51/245 |
| 11,516,954 B2 * | 12/2022 | Scofield | A01B 1/028 |
| 2010/0236210 A1 | 9/2010 | Compton | |
| 2016/0278283 A1 * | 9/2016 | Hebert, Sr. | A01D 7/06 |
| 2017/0001296 A1 * | 1/2017 | Murphy | B05C 17/0205 |
| 2021/0062835 A1 * | 3/2021 | Saeter | F16B 2/065 |
| 2022/0248598 A1 * | 8/2022 | Besler | A01D 7/10 |
| 2024/0357977 A1 * | 10/2024 | O' Neal | A01D 7/10 |

* cited by examiner

SWIVEL COUPLING DEVICE FOR RAKES AND OTHER YARD TOOLS

FIELD OF THE INVENTION

The present invention relates to a swivel coupling device for rakes or other yard tools having handles that allows two of the implements to be quickly and easily connected for use of the combination to scoop, rake or the like various materials, and disconnected just as easily thereafter. The device includes a pair of clamp assemblies including tubular sleeves rotatably connected by a swivelable knuckle or in other words a swivel joint. Advantageously, the handle of each implement can be rotated around its longitudinal axis within a respective clamp assembly.

BACKGROUND OF THE INVENTION

Rakes and other yard tools are commonly utilized to pick up leaves, grass clippings, waste, debris, garbage and the like. Such tools can be used to place the items to be picked up and removed into a pile, which is then often manually picked up. Many tools, when utilized singularly often require bending, which is undesirable to some individuals.

To minimize bending or lessen the amount of time spent at such tasks, systems have been invented for connecting multiple yard tools.

U.S. Pat. No. 5,459,988 relates to a quick connect rake system preferably comprising two rakes or similar yard tools pivoted together by a quick-connect tube system. The tube attaches to the handle of one rake and pivotally couples the handle of a second rake. The tube has a follower slot extending along one of its sides and a hole on the opposite side. The follower slot has an admission orifice at one end to receive the head of a conventional screw to attach the tube to the rake. The remainder of the slot captivates the head of a screw attached to a second rake. The captivation of the screw head pivotally couples the two rakes. The hole in the tube facilitates the permanent attachment of the tube to the rake.

U.S. Pat. No. 3,688,484 relates to a first rake head fixed to an elongated handle and combined with a second rake head and handle by a pivot pin connecting the handles at a central point such that the rake tines may be brought together in opposite hand orientation to lift gathered material to a receptacle. Preferably, the pivot pin connects the rake handles at a flattened area on each handle to provide free motion of the rake heads to and from each other. The flattened portion of each handle may be separated from the shank of the rake handle extending from the tines.

U.S. Pat. No. 3,350,866 relates to a tool for the removal of leaves and other debris from lawns, and is designed to automatically collect and trap such debris (until released) merely by using the tool in the same manner as an ordinary lawn rake, and without first raking such debris into piles, its trapping action being dependent on the interaction between two groups of specially bent tines located respectively on two opposing rake-heads between which the debris is trapped.

U.S. Pat. No. 2,945,713 relates to clamp mechanisms and particularly to an adjustable clamp of simple construction including a swivel axis and adapted to receive and firmly hold an elongated object at any desired angle to such swivel axis. Although exemplary embodiments of such clamp mechanisms are described as particularly adapted to use in the erection of surgical traction apparatus, exercise bars, etc., in hospitals, convalescent homes, etc., the clamping devices are reportedly also adapted to many other and different uses; for example, in the erection of scaffolding, acrobatic playground devices and various other temporary or semipermanent structures.

U.S. Pat. No. 1,588,927 relates to a device which may be broadly referred to as a garden implement.

U.S. Des. Patent No. 336,731 relates to the ornamental design for a swivel coupling for a leaf rake tool.

While the disclosed devices facilitate picking up or moving material such as leaves, grass clippings, waste, debris, garbage and the like, the art still needs a device which permits temporary coupling of a pair of yard tools, in particular rakes in one embodiment, that allows the tools to be utilized individually and also be coupled quickly in order to use the combination as a grabbing device, scoop, large rake, or the like. Further, the art needs a device that in addition to a feature of being able to grab and let go of debris, or similar, at the will of an operator, provides other features in a combination of features without burdensome complexity. Another combined feature provides temporary coupling and uncoupling of two rakes or other yard tools. Also, the art needs yet another feature, in combination with other features, that allows a user to move the two rakes or other tools into a variety of positions relative to each other; that is to say, that the two tools may be oriented by the user to face each other in an opposing hands arrangement, or otherwise oriented to be side by side in a palms open arrangement, or indeed any incremental angle that lies between mentioned opposing or open hands arrangements. Useful mentioned features in combination are further needed to allow an increase in the productivity of users by providing them with a variety of yard tools while only carrying one combination set of tools back and forth.

Objects and Advantages of the Invention

An object of the invention is a device having a useful first feature that enables two rakes or other yard tools having handles to be rapidly and easily connected and disconnected according to the needs of the user. An advantage to the user is that existing art rakes may be used to carry out the other useful features of the invention, obviating the cost of a special purpose set of rakes. Furthermore, this feature allows the user to carry out some other useful features of the invention, yet may use one or both rakes individually in their usual way, while saving them the effort of carrying addition rakes back and forth on site.

Another object of the invention is a device having a useful second feature that enables two tools such as rakes (that may have long handles and have paddle shaped ends) to be coupled together to allow a user to bring the two tools together so as to grab leaves and other debris, collect, lift, and move the grabbed leaves, and later then to open the two tools apart so as to discharge the leaves into a selected location.

Yet another object of the invention is a device having a useful third feature that enables two tools such as rakes (that may have long handles and have paddle shaped ends) to be coupled together to allow a user to orient each tool around its own longitudinal axis so as to form the two tools into a flat but now 'larger scoop or rake, or to allow the two rakes to form a 'v' shape or upside down 'v' shaped tool, or even to allow the two rakes to be positioned perpendicularly to each other. Thus a user may be able to get debris out of awkward positions such as furrows or corners that would otherwise be difficult with prior art yard tools. Also, a larger 'doubled' rake formed from two rakes side by side in open palm fashion is useful in particular situations as a rake and as a scoop.

Yet another object of the invention is to provide a combination of some or all mentioned useful features into an embodiment of the invention. The combination of features now greatly increase the advantages for a user, since much effort may be reduced when fewer tools need to be carried back and forth over distance. Besides, the rakes in a coupled mode already allow enhanced productivity to a user.

SUMMARY OF THE INVENTION

Solutions to the above noted problems and others are provided by the swivel coupling device of the present invention which enables rakes or other yard tools having handles to be rapidly and easily connected and disconnected according to the needs of the user. Advantages of the device include the ability to pick up loose material, for example leaves, grass clippings, waste, debris, garbage and the like with a scooping motion, in particular without having to bend as much as one would have if only utilizing a single rake or tool. A further advantage enables the user to lift the material with ease and more efficiency than with one tool alone.

In one embodiment a swivel coupling device is provided with a first clamp assembly fora first implement having a handle, such as a rake or other tool, and a second clamp assembly for a second implement having a handle, such as a rake or other tool, and a swiveable knuckle joint rotatably connecting the first clamp assembly to the second clamp assembly, wherein the knuckle joint has a first segment connected to the first clamp assembly and second segment connected to the second clamp assembly.

In a further embodiment, the clamp assemblies each comprise a tubular sleeve adapted to have a handle on the first rake extend therethrough along a longitudinal axis and a clamp that operatively fixes the tubular sleeve such that the handle can be rotated on the longitudinal axis during use, if desired.

In one aspect, a swivel coupling device for tools such as rakes is disclosed, comprising: a first clamp assembly for a first rake, the first clamp assembly having i) a first tubular sleeve adapted to have a handle of the first rake extend therethrough along a longitudinal axis, and ii) a clamp including at least two fasteners, wherein when in a tightened state the clamp operatively connects the first tubular sleeve to the handle such that the handle can be rotated on the longitudinal axis; a second clamp assembly for a second rake, the second clamp assembly having i) a second tubular sleeve adapted to have a handle of the second rake extend therethrough along a longitudinal axis, and ii) a second clamp including a fastener, wherein when in a tightened state the clamp operatively connects the second tubular sleeve to the handle such that the second rake handle can be rotated on the longitudinal axis; and a swivelable knuckle joint rotatably connecting the first clamp assembly to the second clamp assembly, wherein the knuckle joint has a first segment connected to the first tubular sleeve and a second segment connected to the second tubular sleeve.

BRIEF DESCRIPTION OF THE DRAWINGS

The invention will be better understood and other features and advantages will become apparent by reading the detailed description of the invention, taken together with the drawings, wherein:

FIG. 5 illustrates the embodiment-type that is shown in FIG. 2; FIG. 6 illustrates the embodiment-type that is shown in FIG. 4.

DETAILED DESCRIPTION OF THE INVENTION

Figure 1:
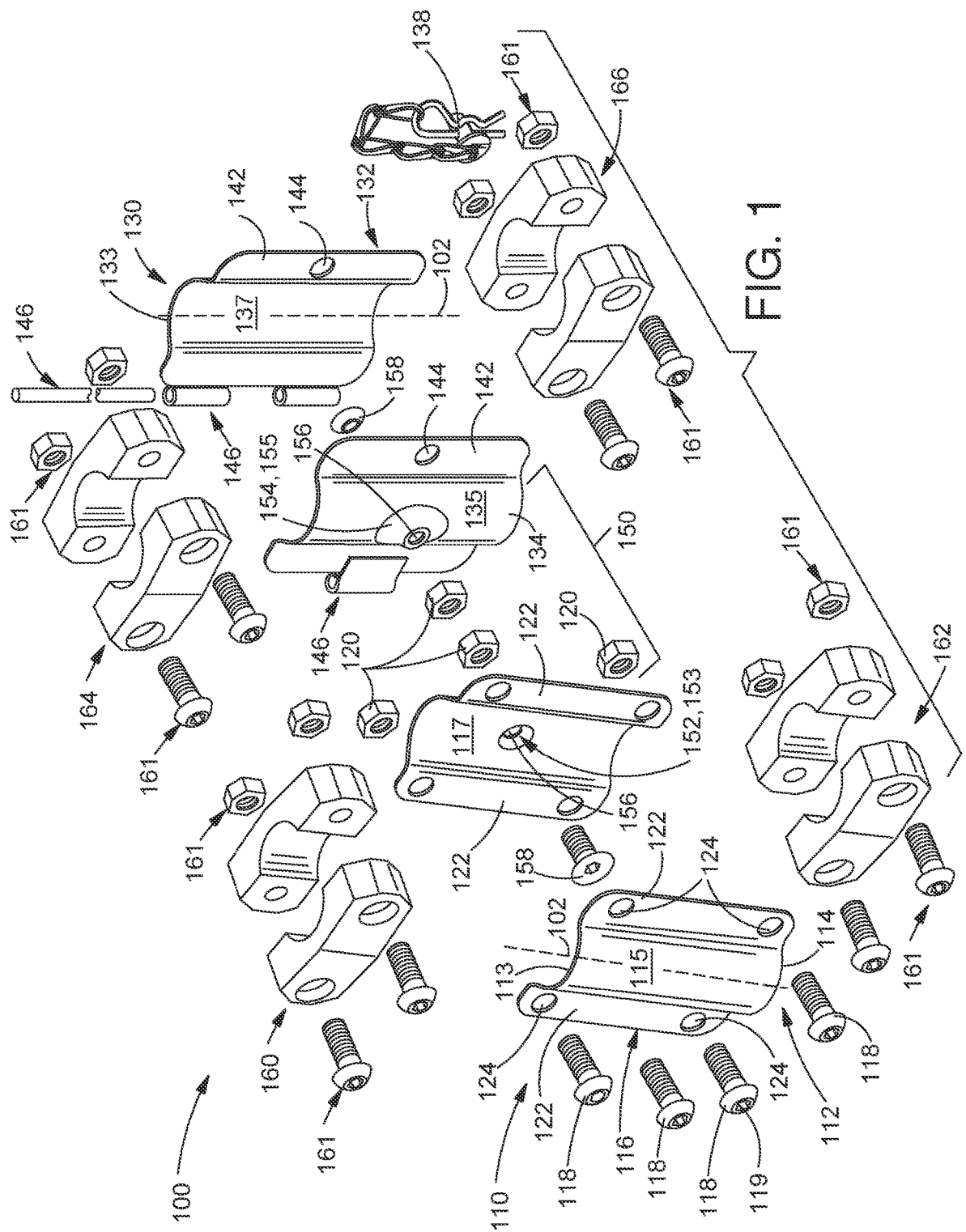
FIG. 1 is a slightly downward-looking exploded, perspective view showing one embodiment of a swivel coupling device.
Figure 2:
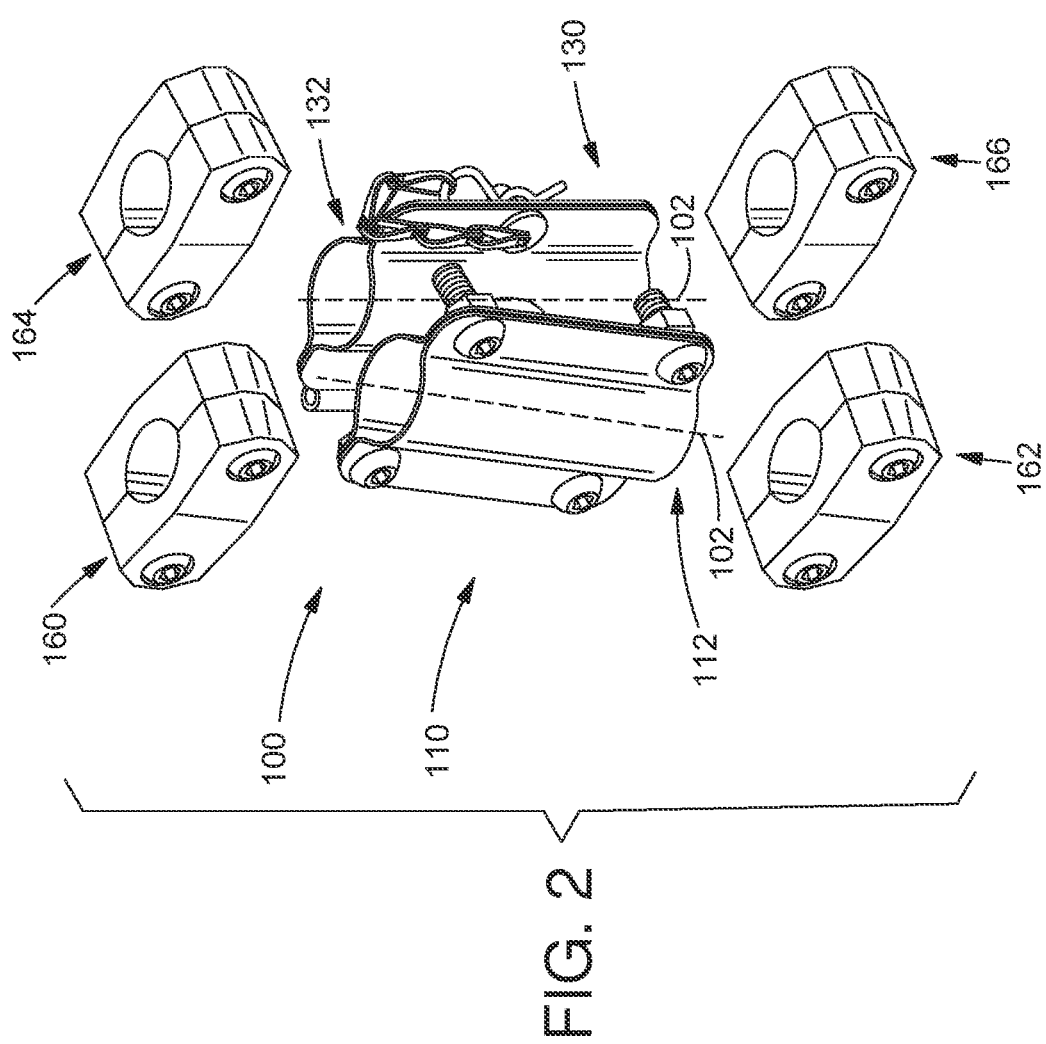
FIG. 2 is a slightly downward-looking assembly perspective view of the device shown in FIG. 1.

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "upper", "down," "lower", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Turning now to the drawings, wherein like reference numbers refer to like or similar components throughout the specification, swivel coupling devices 100, 200 are shown in FIGS. 1-6.

Starting with device 100, a first clamp assembly 110 is shown operatively connected to a second clamp assembly 130 by a swivel joint 150. The first clamp assembly 110 includes first tubular sleeve 112 adapted to have a handle of a first tool extend therethrough along a longitudinal axis 102. Tubular sleeve 112 has an upper end 113 and lower end 114. First clamp assembly 110 further includes a clamp 116 including at least two fasteners 118 which can be, for example, but not limited to, a bolt 119 and nut 120 combination.

Tubular sleeve 112 has a first half or section 115 and a second half or section 117 which together enclose a portion of the handle of the tool when connected. Tubular sleeve 112 has one or more flanges 122 which extend outwardly from the cylindrical main body of the tubular sleeve 112. In a preferred embodiment, first section 115 and second section 117 each have two flanges which extend outwardly from a semi-cylindrical section of tubular sleeve 112. Each flange 122 includes at least one aperture 124.

First clamp assembly 110 illustrated in FIG. 1 includes first section 115 having a pair of flanges and second section 117 having a pair of flanges 122 with each flange including two apertures 124.

Fasteners 118 extend through apertures 124 of first section 115 and corresponding apertures 124 of second section 117 in order to connect the first section to the second section 117. The fastener is extendable through an aperture to fixedly connect the two sections 115, 117 to each other and operatively connect the first rake handle to the first clamp assembly 110. In a mode of operation, the first clamp assembly 110 thus loosely encloses a portion of first rake handle so as to allow rotation of the handle about longitudinal axis 102. The potential for rotation of the handle within the clamp assembly 110 is indicated by the arrows shown above the front rake in FIG. 5.

The second clamp assembly 130 has a second tubular sleeve 132 adapted to have a handle of a second rake or other tool extend therethrough along a longitudinal axis 102 of the second clamp assembly 130. Tubular sleeve 132 has an upper end 133 and a lower end 134. Tubular sleeve 132 has a first half or section 135 and second half or section 137 which together enclose a portion of the handle of the second tool.

The second clamp assembly 130 also includes flanges 142 which extend outwardly from the cylindrical main body of the tubular sleeve 132. In one embodiment, first section 135 includes a pair of flanges 142 and second section 137 includes a pair of flanges 142, with each flange extending outwardly from the semi-cylindrical section of each of first section 135 and second section 137. In a preferred embodiment, at least one flange of each first section 135 and second section 137 of tubular sleeve 132 includes an aperture 144.

A hinge 146 is operatively connected between flanges 142 of first section 135 and second section 137. The hinge 146 allows first section 135 of a second clamp assembly 130 to be rotated towards and away from second section 137 thus negating the need to slide the handle of the second tool or rake into and out of tubular sleeve 132 along the longitudinal axis 102. Thus, second clamp assembly 130 provides a quick-connect mechanism for connecting a second tool or rake to device 100.

A quick-connect fastener 138 is preferably utilized to secure the flanges 142 of the first section 135 and second section 137 located opposite hinge 146. Fastener 138 illustrated is a bolt and pin combination wherein the bolt is extended through apertures 144 in flanges 142 of the first section 135 and second section 137. Thereafter, a pin 138 is placed through an aperture in the bolt or otherwise connected to the bolt to operatively connect the flanges and thus the second tool or rake to the second clamp assembly 130. In a mode of operation, the second clamp assembly 130 thus loosely encloses a portion of second rake handle so as to allow rotation of handle about longitudinal axis 137. The potential for rotation of the handle within clamp assembly 130 is indicated by the arrows shown above the back rake in FIG. 5.

Swivel joint 150 rotatably connects the first clamp assembly 110 to second clamp assembly 130, wherein the swivel joint 150 has a first segment 152 connected to the first tubular sleeve 112 and a second segment 154 connected to the second tubular sleeve 132. Swivel joint 150 includes a first swivel housing 153 formed in or connected to first tubular sleeve 112. The first swivel housing 153 extends outwardly from the outer surface of the first tubular sleeve 112, for example as illustrated in the drawings. A second swivel housing 155 is formed in or connected to the second tubular sleeve 132. Second swivel housing 155 extends outwardly from the outer surface of the second tubular sleeve 132. The first swivel housing 153 and the second swivel housing 155 each have apertures 156 at a distal end of the housing with respect to the longitudinal axis 102. A shaft of a swivel element 158 extends through each of the first swivel housing aperture 156 and second swivel housing aperture 156.

Swivel element 158 has i) a first end located in the first swivel housing, the first end having a first head larger in size than the first swivel housing aperture that prevents withdrawal of the first head from its housing through the aperture and ii) a second end having a second head larger in size than the second swivel housing aperture that prevents withdrawal of the second head through the second swivel housing aperture, and wherein the first head and the second head prevent withdrawal of the swivel element from the first swivel housing and the second swivel housing.

In a preferred embodiment, the swivel element 158 comprises a bolt having a tapered head which mateingly engages an inner tapered segment of one of the swivel housings 153, 155. The swivel coupling also preferably includes a tapered nut which mateingly engages a further tapered segment of the opposite swivel housing. The mated configuration allows pivoting or swiveling between the first clamp assembly and the second clamp assembly.

First clamp assembly 110 includes a first collar 160 and a second collar 162. A collar fastener 161, preferably comprising a nut and bolt combination connects the first collar 160 to the handle of the tool at a location above upper end 113 of first tubular sleeve 112. Similarly, second collar 162 is connected to the handle of the first tool at a location below lower end 114 of first tubular sleeve 112 utilizing clamp fastener 161. First collar 160 and second collar 162 are free of fixed connection to the first tubular sleeve 112.

In an analogous manner, third collar 164 and fourth collar 166 are connected to the handle of the second tool at a location above and below second tubular sleeve 132 utilizing fasteners 161. Third collar 164 and fourth collar 166 are free of a fixed connection to the second tubular sleeve 132. These four collars 160, 162, 164 and 166 stay attached to respective tools. The two collars attached to the second tool cannot be permanently fixed together with the second clamp assembly 130 in order to allow for withdrawal of second tool from the assembly after user opens the hinge mechanism. Yet the collars attached to the second rake in FIG. 5 allow for quick and correct relocation of the second rake into the swivel coupling device.

Figure 3:
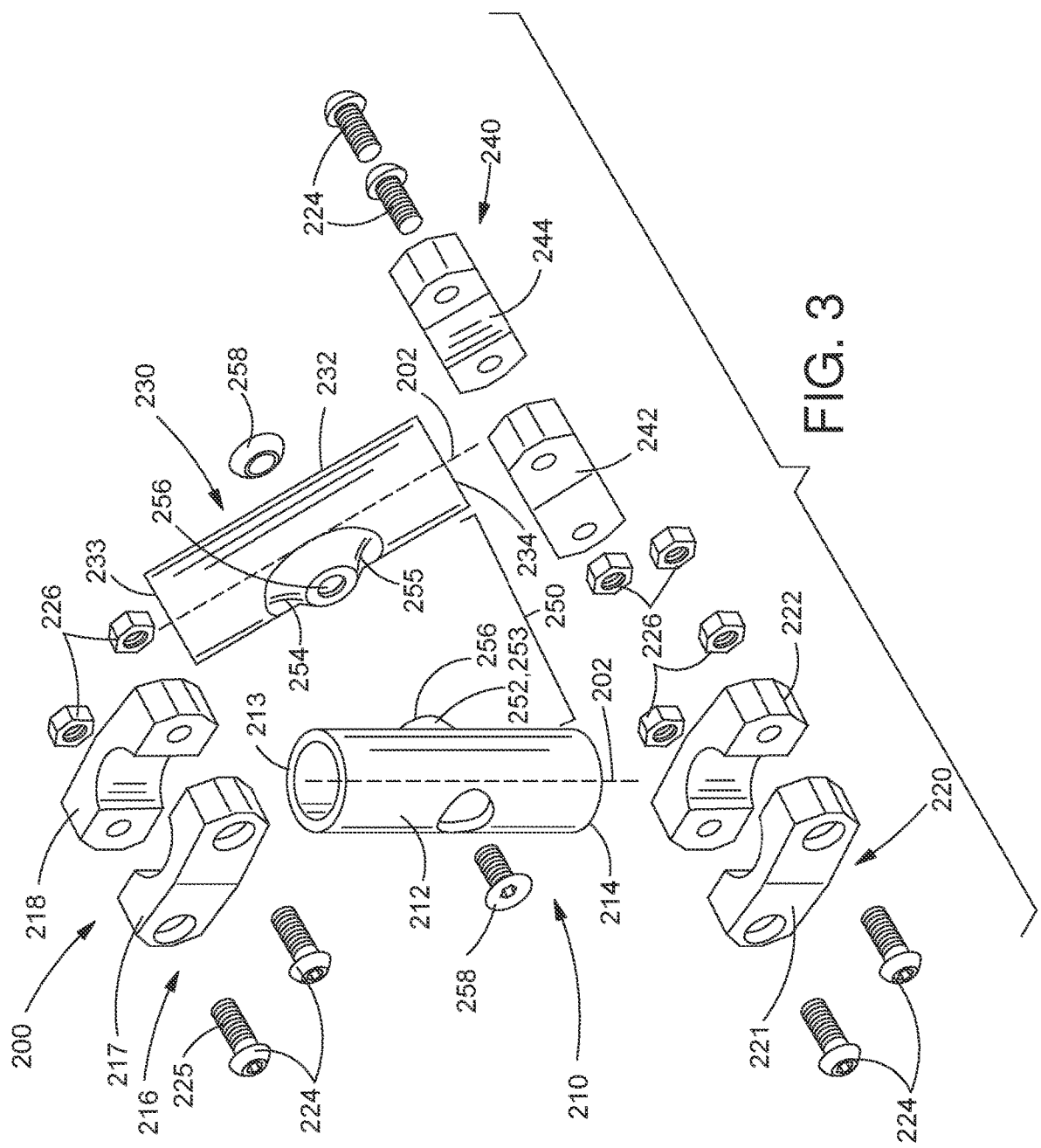
FIG. 3 is a slightly downward-looking exploded, perspective view showing a further embodiment of a swivel coupling device.
Figure 4:
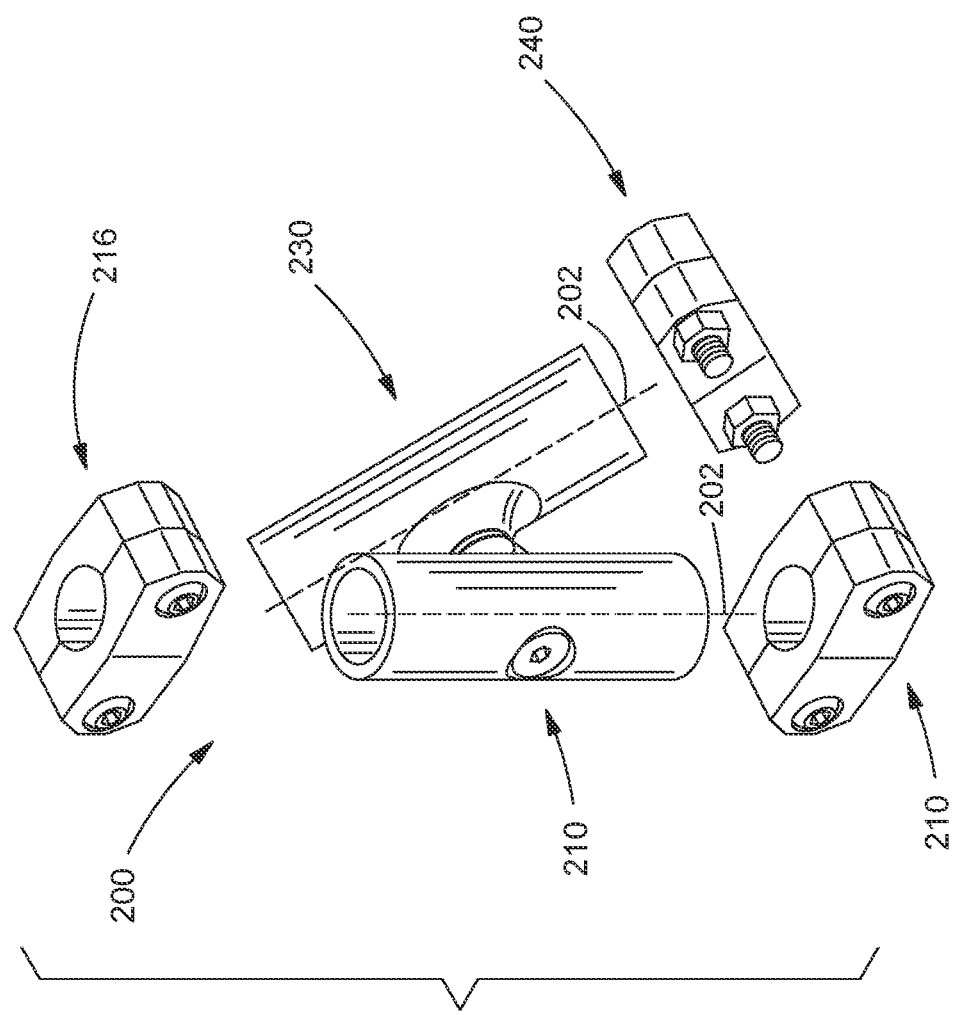
FIG. 4 is a slightly downward-looking assembly perspective view of the device shown in FIG. 3.
Figure 5:
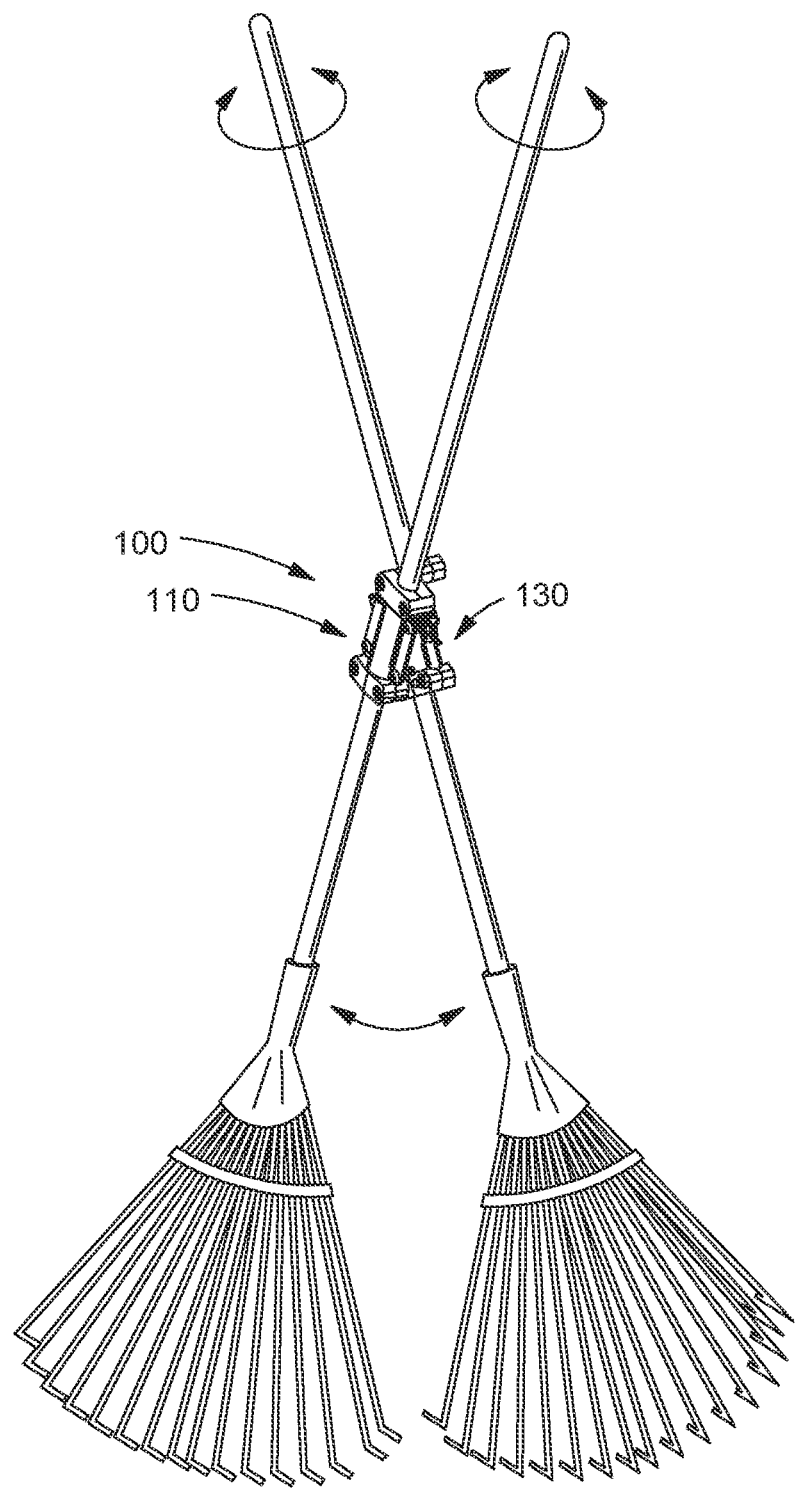
FIG. 5 is a side view of a swivel coupling device while in operation together with two rakes.
Figure 6:
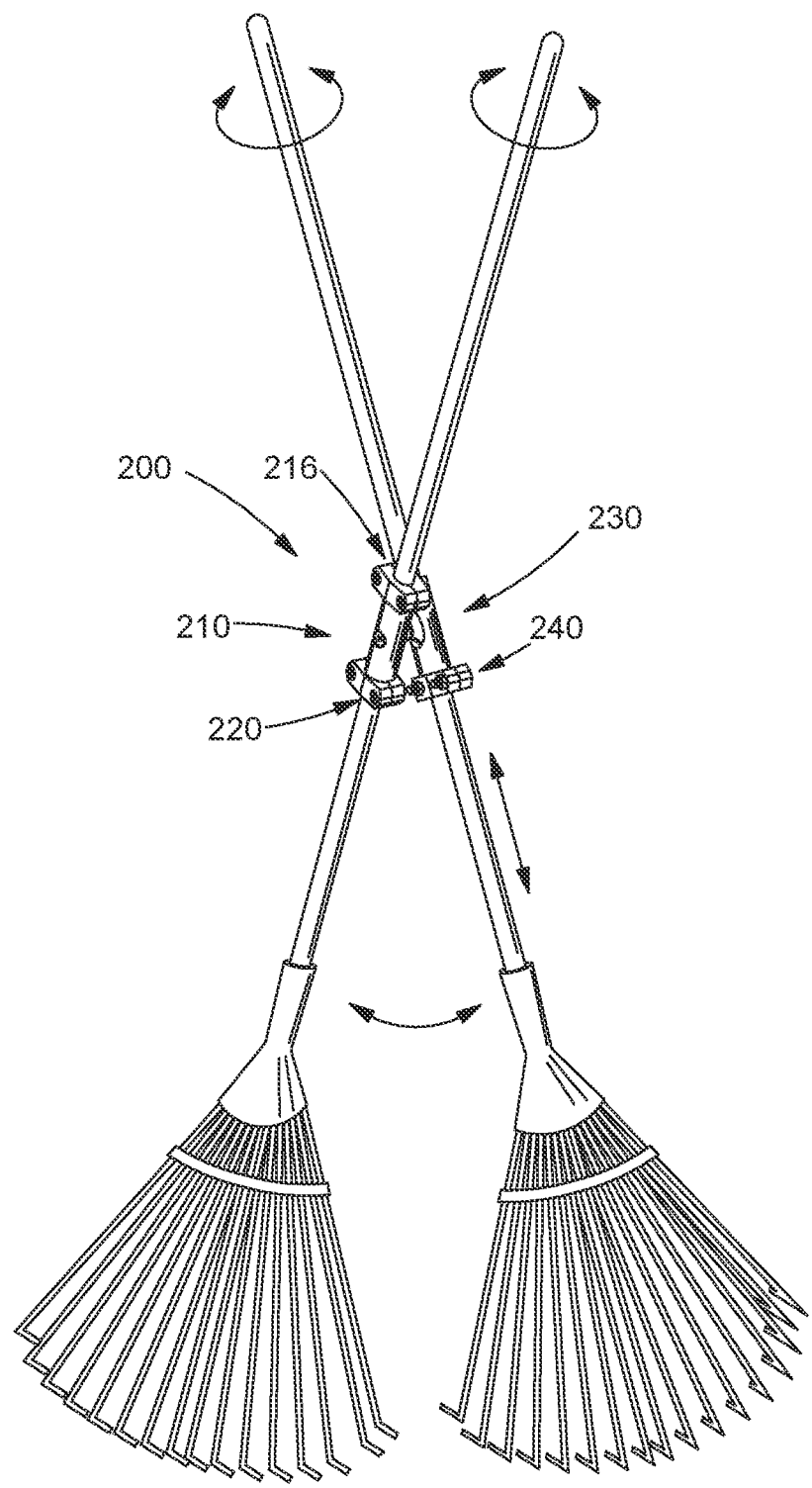
FIG. 6 is a side view of a swivel coupling device while in operation together with two rakes.

FIGS. 3 and 4 illustrate a further embodiment of a swivel coupling device 200 which includes a first clamp assembly 210 operatively connected to a second clamp assembly 230 by a swivelable knuckle joint 250. First clamp assembly 210 includes a first tubular sleeve 212 adapted to have a handle of a first tool extend therethrough along longitudinal axis 202. Tubular sleeve 212 includes an upper end 213 and lower end 214.

First clamp assembly 210 includes a first collar 216 and a second collar 220. At least one clamp fastener operatively connects the first collar 216 to the handle of the tool at a location above upper end 213 of the first tubular sleeve 210. Similarly, second collar 220 is connected to the handle of the first tool at a location below lower end 214 of first tubular sleeve 210 utilizing a clamp fastener 224. Clamp fastener 224 preferably comprises a bolt 225 and a nut 226. In one embodiment, first collar 216 and second collar 220 are free of the fixed connection to first tubular sleeve 210.

First collar 216 in one embodiment includes a first section 217 and second section 218, each having semi-cylindrical portions designed to fit a contour of the handle of the tool to which the first clamp assembly 210 is to be connected to. Similarly, second collar 220 includes a first section 221 and a second section 222, each having semi-cylindrical portions designed to fit a contour of the handle of the tool to which the first clamp assembly 210 is to be connected to.

Second clamp assembly has a second tubular sleeve 232 adapted to have a handle of a second tool such as a rake extend therethrough along longitudinal axis 202 of second clamp assembly 230. Tubular sleeve 232 has an upper end 233 and lower end 234. Second clamp assembly 230 includes a third collar 240 adapted to be operatively connected to a handle of the second tool, preferably below lower end 234 of second tubular sleeve 232. Third collar 240 preferably includes a first section 242 and a second section 244 which are operatively connected by fastener 224. First section 242 and second section 244 each have semi-cylindrical portions designed to fit a contour of the handle of the tool to which clamp assembly 230 is to be connected to.

Swivelable knuckle joint 250 rotatably connects the first clamp assembly 210 to second clamp assembly 230, wherein the knuckle joint 250 has a first segment 252 connected to the first tubular sleeve 212 and a second segment 254 connected to the second tubular sleeve 232. Knuckle joint 250 includes a first swivel housing 253 formed in or connected to first tubular sleeve 212. The first swivel housing 253 extends outwardly from the outer surface of the first tubular sleeve 212, for example as illustrated in the drawings. A second swivel housing 255 is formed in or connected to the second tubular sleeve 232. Second swivel housing 255 extends outwardly from the outer surface of the second tubular sleeve 232. The first swivel housing 253 and the second swivel housing 255 each have apertures 256 at a distal end of the housing with respect to the longitudinal axis 202. A shaft of the swivel element 258 extends through each of the first swivel housing aperture 256 and second swivel housing aperture 256.

Swivel element 258 has i) a first end located in the first swivel housing, the first end having a first head larger in size than the first swivel housing aperture that prevents withdrawal of the first head from its housing through the aperture and ii) a second end having a second head larger in size than the second swivel housing aperture that prevents withdrawal of the second head through the second swivel housing aperture, and wherein the first head and the second head prevent withdrawal of the swivel element from the first swivel housing and the second swivel housing.

In a preferred embodiment, the swivel element 258 comprises a bolt having a tapered head which mateingly engages an inner tapered segment of one of the swivel housings 253, 255. The swivel coupling also preferably includes a tapered nut which mateingly engages a further tapered segment of the opposite swivel housing. The mated configuration allows pivoting or swiveling between the first clamp assembly and the second clamp assembly.

The collar 240 that belongs with second clamp assembly 230 stays attached to the second rake handle in order to set a position for the second tubular sleeve to fit onto. Yet, the second rake handle may be withdrawn downwards as viewed in FIG. 6 from the second tubular sleeve 230 at the will of an operator. Thus the second rake collar is attached to its second rake and is free of a fixed connection to second tubular sleeve 232.

The swivel coupling devices of the invention can be quickly connected to two tools such as rakes which then can be utilized in combination to perform a desired yard task such as picking up or raking leaves or other debris. Thereafter, if desired, the second tool can be disconnected from the swivel coupling device just as quickly as it was connected thereto.

For the avoidance of doubt, the devices and methods of the present invention encompass all possible combinations of the components, including various ranges of said components, disclosed herein. It is further noted that the term 'comprising' does not exclude the presence of other elements. However, it is also to be understood that a description of a product comprising certain components also discloses a product consisting of these components. Similarly, it is also to be understood that a description on a process comprising certain steps also discloses a process consisting of these steps.

In accordance with the patent statutes, the best mode and preferred embodiment have been set forth; the scope of the invention is not limited thereto, but rather by the scope of the attached claims.

What is claimed is:

1. A swivel coupling device for rakes, comprising:
 a first clamp assembly for a first rake, the first clamp assembly having i) a first tubular sleeve adapted to have a handle of the first rake extend therethrough along a longitudinal axis, and ii) a clamp including at least two fasteners, wherein when in a tightened state the clamp operatively connects the first tubular sleeve to the handle such that the handle can be rotated on the longitudinal axis without causing rotation of the first tubular sleeve;
 a second clamp assembly for a second rake, the second clamp assembly having i) a second tubular sleeve adapted to have a handle of the second rake extend therethrough along a longitudinal axis, and ii) a second clamp including a fastener, wherein when in a tightened state the clamp operatively connects the second tubular sleeve to the handle such that the second rake handle can be rotated on the longitudinal axis without causing rotation of the second tubular sleeve; and
 a swivelable joint rotatably connecting the first clamp assembly to the second clamp assembly, wherein the joint has a first segment connected to the first tubular sleeve and a second segment connected to the second tubular sleeve.

2. The swivel coupling device according to claim 1, wherein the joint includes i) a first swivel housing formed in or connected to the first tubular sleeve, the first swivel housing extending outwardly from a side surface of the first tubular sleeve, ii) a second swivel housing formed in or connected to the second tubular sleeve, the second swivel housing extending outwardly from a side surface of the second tubular sleeve, and iii) a swivel element extending between and rotatably connecting the first swivel housing and second swivel housing, the swivel element having a first end located in the first swivel housing and a second end located in the second swivel housing.

3. The swivel coupling device according to claim 2, wherein the first swivel housing and second swivel housing each have apertures at a distal end of the housing with respect to distance from the longitudinal axis, and wherein a shaft of the swivel element extends through each of the first swivel housing aperture and second swivel housing aperture.

4. The swivel coupling device according to claim 3, wherein the swivel element has i) a first end located in the first swivel housing, the first end having a first head larger in size than the first swivel housing aperture that prevents withdrawal of the first head from its housing through the aperture and ii) a second end having a second head larger in size than the second swivel housing aperture that prevents withdrawal of the second head through the second swivel housing aperture, and
    wherein the first head and the second head prevent withdrawal of the swivel element from the first swivel housing and the second swivel housing.

5. The swivel coupling device according to claim 2, wherein the first tubular sleeve comprises two sections, with each section having a pair of flanges each including an aperture, wherein the flanges extend outwardly on the first tubular sleeve at a location substantially 90° from the first swivel housing measured in relation to the longitudinal axis, wherein a fastener is extendable through the apertures to fixedly connect the two sections to each other and operatively connect the first rake handle to the first clamp assembly.

6. The swivel coupling device according to claim 5, wherein the flanges of the first tubular sleeve each include a plurality of apertures, with a fastener extendable through each.

7. The swivel coupling device according to claim 5, wherein the two sections of the first tubular sleeve are connected utilizing four fasteners which each consist of a nut and bolt combination.

8. The swivel coupling device according to claim 1, wherein the second tubular sleeve comprises two sections with each section having a pair of flanges, wherein a hinge connects the flange of one section to one flange of the other section which allows the handle to be removed from the clamp assembly without having to slide the handle out of the clamp assembly in the longitudinal direction of the second tubular sleeve, wherein the flanges not connected to the hinge each include apertures which are connectable utilizing a fastener in order to operatively fix the second rake handle to the second clamp assembly.

9. The swivel coupling device according to claim 1, wherein the first clamp assembly is free of a hinge.

10. A swivel coupling device for rakes, comprising:
    a first clamp assembly for a first rake, the first clamp assembly having i) a first tubular sleeve adapted to have a handle of the first rake extend therethrough along a longitudinal axis, and ii) a clamp including at least two fasteners, wherein when in a tightened state the clamp operatively connects the first tubular sleeve to the handle such that the handle can be rotated on the longitudinal axis;
    a second clamp assembly for a second rake, the second clamp assembly having i) a second tubular sleeve adapted to have a handle of the second rake extend therethrough along a longitudinal axis, and ii) a second clamp including a fastener, wherein when in a tightened state the clamp operatively connects the second tubular sleeve to the handle such that the second rake handle can be rotated on the longitudinal axis; and
    a swivelable joint rotatably connecting the first clamp assembly to the second clamp assembly, wherein the joint has a first segment connected to the first tubular sleeve and a second segment connected to the second tubular sleeve,
    wherein the first clamp assembly clamp includes a first collar and a second collar, wherein at least one collar fastener operatively connects the first collar to the handle of the first rake at a location above an upper end of the first tubular sleeve, and wherein at least one second collar fastener is operatively connects the second collar to the handle of the first rake at a location below a lower end of the first tubular sleeve.

11. The swivel coupling device according to claim 10, wherein the second clamp assembly includes a third collar and optionally a fourth collar, and wherein at least one third collar fastener operatively connects the third collar to the handle of the second rake below a lower end of the tube sleeve.

12. The swivel coupling device according to claim 11, wherein the first collar, the second collar, and the third collar each have a first segment connectable to a second segment via a pair of the respective collar fasteners.

13. The swivel coupling device according to claim 12, wherein the collar fasteners are each comprised of a nut and a bolt.

14. The swivel coupling device according to claim 11, wherein the joint includes i) a first swivel housing formed in or connected to the first tubular sleeve, the first swivel housing extending outwardly from the first tubular sleeve, ii) a second swivel housing formed in or connected to the second tubular sleeve, the second swivel housing extending outwardly from the second tubular sleeve, and iii) a swivel element extending between and rotatably connecting the first swivel housing and second swivel housing, the swivel element having a first end located in the first swivel housing and a second end located in the second swivel housing.

15. The swivel coupling device according to claim 14, wherein the first swivel housing and second swivel housing each have apertures at a distal end of the housing with respect to distance from the longitudinal axis, and wherein a shaft of the swivel element extends through each of the first swivel housing aperture and second swivel housing aperture.

16. The swivel coupling device according to claim 15, wherein the swivel element has i) a first end located in the first swivel housing, the first end having a first head larger in size than the first swivel housing aperture that prevents withdrawal of the first head from its housing through the aperture and ii) a second end having a second head larger in size than the second swivel housing aperture that prevents withdrawal of the second head through the second swivel housing aperture, and
    wherein the first head and the second head prevent withdrawal of the swivel element from the first swivel housing and the second swivel housing.

17. The swivel coupling device according to claim 11, wherein the first collar, the second collar and the third collar are not fixedly connected to the first tubular sleeve and the second tubular sleeve.

18. A swivel coupling device for rakes, comprising:
    a first clamp assembly for a first rake, the first clamp assembly having i) a first tubular sleeve adapted to have a handle of the first rake extend therethrough along a longitudinal axis, and ii) a clamp including at least two fasteners, wherein when in a tightened state the clamp operatively connects the first tubular sleeve to the handle such that the handle can be rotated on the longitudinal axis within and with respect to the first clamp assembly;
    a second clamp assembly for a second rake, the second clamp assembly having i) a second tubular sleeve adapted to have a handle of the second rake extend therethrough along a longitudinal axis, and ii) a second clamp including a fastener, wherein when in a tightened state the clamp operatively connects the second tubular sleeve to the handle such that the second rake handle can be rotated on the longitudinal axis within and with respect to the second clamp assembly; and a swivelable joint rotatably connecting the first clamp assembly to the second clamp assembly, wherein the joint has a first segment connected to the first tubular sleeve and a second segment connected to the second tubular sleeve; and wherein the second tubular sleeve comprises two sections with each section having a pair of flanges, wherein a hinge connects the flange of one section to one flange of the other section which allows the handle to be removed from the clamp assembly without having to slide the handle out of the clamp assembly in the longitudinal direction of the second tubular sleeve, wherein the flanges not connected to the hinge each include apertures which are connectable utilizing a fastener in order to operatively fix the second rake handle to the second clamp assembly.

19. The swivel coupling device according to claim 18, wherein the first clamp assembly clamp includes a first collar and a second collar, wherein at least one collar fastener operatively connects the first collar to the handle of the first rake at a location above an upper end of the first tubular sleeve, and wherein at least one second collar fastener operatively connects the second collar to the handle of the first rake at a location below a lower end of the first tubular sleeve.

20. The swivel coupling device according to claim 19, wherein the second clamp assembly includes a third collar and optionally a fourth collar, and wherein at least one third collar fastener operatively connects the third collar to the handle of the second rake below a lower end of the tube sleeve.

* * * * *